US00RE39506E

(19) United States
(12) Reissued Patent
Glover

(10) Patent Number: US RE39,506 E
(45) Date of Reissued Patent: Mar. 13, 2007

(54) CRANKCASE SCAVENGED TWO-STROKE ENGINES

(75) Inventor: Stephen Brian Glover, Shoreham-by-Sea (GB)

(73) Assignee: Ricardo UK Limited, West Sussex (GB)

(21) Appl. No.: 10/226,285

(22) Filed: Aug. 13, 2002

Related U.S. Patent Documents

Reissue of:
(64) Patent No.: 6,101,991
Issued: Aug. 15, 2000
Appl. No.: 09/392,032
Filed: Sep. 8, 1999

U.S. Applications:
(63) Continuation of application No. PCT/GB99/01412, filed on May 6, 1999.

(30) Foreign Application Priority Data

May 11, 1998 (GB) ..... 9810057

(51) Int. Cl.
*F02B 33/04* (2006.01)

(52) U.S. Cl. ..... 123/73 PP; 123/73 A
(58) Field of Classification Search ..... None
See application file for complete search history.

(56) References Cited

U.S. PATENT DOCUMENTS 4,248,185 A * 2/1981 Jaulmes
4,289,094 A * 9/1981 Tanahashi ..... 123/69 R
4,598,673 A * 7/1986 Poehlman

* cited by examiner

*Primary Examiner*—Noah P. Kamen
(74) *Attorney, Agent, or Firm*—Reed Smith LLP

(57) ABSTRACT

A crankcase scavenged two-stroke engine includes a piston reciprocably mounted in a cylinder. The cylinder wall has an exhaust port and a rear transfer port opposed thereto formed in it. The rear transfer port communicates with the interior of the crankcase via a rear transfer passage and is arranged to open before the exhaust port closes, whereby, in use, the cylinder is scavenged. An inlet duct is arranged to supply combustion air to the crankcase and a throttling valve is arranged to throttle the flow of air through the inlet duct. A carburettor is arranged to supply fuel into the inlet duct. The interior of the crankcase is divided into at least two separate crankcase volumes, a rich volume (V1, V2) and a lean volume (V3). Each crankcase volume communicates with the cylinder via a respective hole in the crankcase wall. The cylinder wall also has at least one lateral transfer port formed in it at a position between the rear transfer port and the exhaust port. The lateral transfer port is arranged to open before the exhaust port closes. The lateral transfer port communicates with the lean volume (V3) via a lateral transfer passage. The rear transfer port communicates with the rich volume (V1, V2). The inlet duct is divided over at least part of its length into at least two inlet passages, a rich passage and a lean passage, which communicate with the rich volume (V1, V2) and the lean volume (V3), respectively. The carburettor and/or the throttle valve are so constructed and arranged that, under high load operation, substantially all the fuel supplied by the carburettor is introduced into the rich passage and, under low load operation, the fuel supplied by the carburettor is introduced into both the rich and lean passages.

12 Claims, 3 Drawing Sheets

CRANKCASE SCAVENGED TWO-STROKE ENGINES

Matter enclosed in heavy brackets [ ] appears in the original patent but forms no part of this reissue specification; matter printed in italics indicates the additions made by reissue.

RELATED APPLICATION

This application is a continuation of PCT/GB99/01412, filed May 6, 1999.

BACKGROUND OF THE INVENTION

The present invention relates to crankcase scavenged two-stroke engines and is particularly, though not exclusively, concerned with small engines of this type which are intended for use on hand-held products such as chain saws, garden blowers and the like.

The cylinder of a crankcase scavenged two-stroke engine includes an inlet port, an outlet port and a transfer port which are arranged so that the exhaust port opens before and closes after the transfer port. The transfer port is essentially one or more transfer passages which connect the cylinder and crankcase and are arranged in such a way that the piston and the cylinder controls the opening and closing of the downstream end of the transfer passages during the engine cycle. This type of engine has a hermetically sealed crankcase which communicates with the cylinder via the transfer port and with the atmosphere via an inlet duct. As the piston performs its cylinder compression stroke, air or an air/fuel mixture is drawn into the crankcase from the atmosphere through the inlet duct and on the subsequent working stroke this air or air/fuel mixture is compressed by the piston. As the piston continues to move it uncovers the downstream end of the transfer port and the air or air/fuel mixture is forced into the cylinder.

The transfer of air or air/fuel mixture into the cylinder only occurs when a positive pressure differential exists between the crankcase and cylinder. The fresh charge of air or air/fuel mixture entering the cylinder causes the displacement of residual gas from the cylinder via the exhaust port. During this cylinder scavenging process a portion of the air or air/fuel mixture that has entered the cylinder flows out of the cylinder via the exhaust port. The charge lost in this way is usually termed the scavenge losses. This loss of charge can also occur during the period in the engine cycle between transfer port closure and exhaust port closure. This period is known as the trapping period and the associated losses are usually termed the trapping losses.

Two-stroke engines of the type which are fitted on to small motorcycles, scooters and the like are typically provided with a carburettor which is arranged to dispense fuel into the inlet duct in an amount which is related to the air flow rate through that duct. This means that all the air/fuel mixture which enters the crankcase and subsequently the cylinder is inherently a substantially homogeneous mixture of air and fuel. This means in turn that the proportion of the scavenging air which flows out of the exhaust port also contains fuel. This results in the unburned hydrocarbon emissions of such engines being relatively high.

Small two-stroke engines, particularly those for use with hand-held products, are facing ever stricter emission control legislation and durability requirements. Yet stricter legislation is expected in the USA in the near future and this legislation will be particularly severe for such small engines and will include limits not only on unburned hydrocarbons (HC) and carbon monoxide (CO) but also particulate emissions. No currently available small two-stroke engine is able to meet the requirements which will be introduced in the USA without emissions control equipment, such as an oxidation catalyst. It should also be noted that with small engines of this type there can be a variation of up to 25% in HC emissions from two engines which are nominally identical. Engine manufacturers are, however, reluctant to use catalysts and/or other potentially costly emissions control equipment and require a solution to the problem that has minimal or zero cost implications. If a catalyst is still required after the implementation of other emissions reducing technology, the load on the catalyst must be minimised in order to reduce the size and cost of the catalyst, to minimise any increase in the exhaust gas temperature and to improve the durability of the catalyst.

The emissions performance of two-stroke engines under high load, i.e. when the throttle is wide open, is crucial for the ability of such engines to obtain certification under emissions control legislation, particularly for those engines which are intended for use with hand-held equipment. It is also under high load that the maximum catalyst/exhaust gas temperatures are reached and at which maximum thermal degradation of the catalyst occurs. Accordingly, any attempt to reduce the emissions of an engine should focus on the emissions at high load, emissions at low load being of substantially lesser importance.

Given the major significance of the emissions at high load for two-stroke engines for use with hand-held equipment, there are in practice only two types of technology that could realistically reduce the HC emissions at high load to acceptable levels, namely catalytic after-treatment and stratified charging. Catalytic after-treatment, comprising subjecting the exhaust gases to an oxidation catalyst, has been referred to above. A catalyst may also be required to reduce CO emission but it is believed that if the engine is adjusted to run with a leaner mixture it may be possible to meet the requirements of the anticipated US legislation without a catalyst. It may be possible also to meet the anticipated legislative requirements relating to HC emissions with a catalyst but the service life of the catalyst may well cause a problem unless the loading to which the catalyst is subjected can be reduced by reducing the HC content of the exhaust gas leaving the engine cylinders. It will be appreciated that reducing the HC loading on the catalyst will reduce the size and cost of the catalyst, minimise the heat added to the exhaust gas by the catalysis, increase the service life of the catalyst and reduce the influence of the catalyst on the exhaust tuning. Stratified charging constitutes, as is known, arranging the inlet system of the engine such that the air/fuel charge entering the cylinder is nonhomogeneous in such a manner that substantially only pure air and a minimum quantity of fuel is permitted to pass directly from the cylinder into the exhaust port during the scavenging and trapping processes.

This may be achieved by providing the engine with direct fuel injection, that is to say a fuel injector which communicates directly with the cylinder and is controlled by an electronic control system which is arranged to ensure that the correct amount of fuel is injected into the cylinder after the exhaust port has closed. Whilst effective, this solution to the problem is expensive due to the need to provide a speed and load-responsive electronic control system and a fuel injector and is thus unacceptable in small, low cost engines.

GB-A-2290349 discloses a further attempt to solve this problem. This specification discloses a crankcase scavenged engine with so-called transfer port stratified charging. The engine disclosed in this prior document includes a transfer port constituted by two or more transfer passages, into only one of which is fuel dispensed. The other or others of the transfer passages communicate with the interior of the cylinder at a position which is further from the crankshaft axis. In use, fuel is dispensed into the one transfer passage substantially continuously at a rate which is a function of the mass flow rate of air through the inlet passage into the crankcase. As the piston performs its exhaust stroke, the exhaust port is the first to be uncovered by the piston and thereafter the other transfer passage or passages are uncovered. Shortly thereafter, the transfer passage into which fuel is dispensed is uncovered and the air/fuel charge flows into the cylinder. However, scavenging is performed predominantly with the pure air which has flowed in through the other transfer passage or passages whereby the amount of unburned fuel which passes straight through the cylinder into the exhaust port during the scavenging process is reduced.

Tests have shown that an engine of the type disclosed in GB-A-2290349 has unburned HC emissions under high load conditions which are reduced by about 50%, as compared to conventional engines. However, as the engine load decreases, the reduction in unburned HC emissions decreases also until at about 40% throttle opening there is no net improvement. As the throttle is closed yet further, the unburned HC emissions are actually increased by comparison with a homogeneously charged two-stroke engine. The reason for this is believed to be that a low engine loads a proportion of the air/fuel charge flows in a direct short circuit across the top of the piston directly to the exhaust port.

A further significant problem with the engine disclosed in GB-A-2290349 relates to the fuel dispensing device which is considerably different to a conventional carburettor. Thus the deviation from known carburettor technology means that the fuel dispensing device is significantly more expensive to manufacture and it has in any event been found in practice that it is very difficult to design a fuel dispensing device which delivers the correct quantity of fuel over the entire engine operating range.

It is therefore that the solution to the emissions problems described above will rely upon using stratified charging at high engine load but homogeneous charging at lower engine load. It is also thought that it is necessary for commercial success for the engine to use a more conventional carburettor.

OBJECT AND SUMMARY OF THE INVENTION

Accordingly, it is the object of the present invention to provide a crankcase scavenged two-stroke engine, particularly though not exclusively for use with hand-held products, which has reduced emissions, particularly at high engine loads, is simply and cheap to manufacture and utilises conventional carburettor technology.

According to the present invention a two-stroke engine of crankcase scavenged type including a piston reciprocably mounted in a cylinder, the cylinder wall having an exhaust port and a rear transfer port opposed thereto formed in it, the rear transfer port communicating with the interior of the crankcase via a rear transfer passage, the rear transfer port being arranged to open before the exhaust port closes whereby, in use, the cylinder is scavenged, an inlet duct arranged to supply combustion air to the crankcase, a throttling valve arranged to throttle the flow of air through the inlet duct, and a carburettor arranged to supply fuel into the inlet duct is characterised in that the interior of the crankcase is divided into at least two separate crankcase volumes, a rich volume and a lean volume, that each crankcase volume communicates with the cylinder via respective hole in the crankcase wall, that the cylinder wall also has at least one lateral transfer port formed in it at a position between the rear transfer port and the exhaust port, the lateral transfer port being arranged to open before the exhaust port closes, that the lateral transfer port communicates with the lean volume via a lateral transfer passage, that the rear transfer port communicates with the rich volume, that the inlet duct is divided over at least part of its length into at least two inlet passages, a rich passage and a lean passage, which communicate with the rich volume and the lean volume, respectively, and that the carburettor and/or the throttling valve are so constructed and arranged that, under high load operation, substantially all the fuel supplied by the carburettor is introduced into the rich passage and, under low load operation, the fuel supplied by the carburettor is introduced into both the rich and lean passages.

Accordingly, the engine in accordance with the present invention includes an inlet duct which is divided into a rich passage and a lean passage and the carburettor and/or the throttling valve are so arranged and operated that the rich passage contains a fuel/air mixture under both high and low load conditions but the lean passage contains air/fuel mixture only under low load conditions and substantially pure air under high load conditions. The rich and lean passages communicate with rich and lean volumes, respectively, in the crankcase which are separated and ideally substantially sealed from one another. The rich volume communicates with the rear transfer port, which is substantially opposed to the exhaust port, whilst the lean volume communicates with the lateral transfer port which is situated between the rear transfer port and the exhaust port.

Under high load conditions, the lateral transfer port opens before the exhaust port closes and substantially pure air flows in through it and purges the cylinder. At the same time or shortly thereafter, the rear transfer port opens and a rich air/fuel mixture flows in. However, this is retained substantially in the proximity of the cylinder wall opposed to the exhaust port by the greater and faster flowing volume of substantially pure air discharged from the lateral port whereby little or no fuel is able to flow out of the exhaust port during the scavenging process. The charge within the cylinder is thus stratified.

Under low load or idling conditions, fuel is introduced into both the rich and lean inlet passages and therefore into both the rich and lean crankcase volumes. As explained above, there is a tendency under low load conditions for the air/fuel mixture discharged from the rear transfer port to flow in a short circuit path directly towards the exhaust port, due to the fact that the air flow through the rear and lateral transfer ports is so very much less vigorous. However, since the air/fuel mixture flowing out through the rear transfer port is very much leaner under low load conditions than high load conditions, due to the fact that the fuel is shared under low load conditions between both the rear transfer port and the lateral transfer port, the actual amount of fuel that is lost to the atmosphere during the scavenging process is acceptably low.

The engine in accordance with the present invention thus has stratified charging at high load conditions and homogeneous charging at low load conditions. As the load drops from its maximum level the carburettor may be arranged to supply a progressively increasing amount of fuel into the lean inlet passage. It is however preferred that this does not commence until the load has dropped to about 50% of its maximum value. From about 40% load to idling load the fuel may be supplied generally equally to the lean and rich inlet passages.

In the preferred embodiments there are two opposed lateral transfer ports formed in the cylinder wall, the interior of the crankcase is divided into three crankcase volumes, namely two rich volumes and one lean volume, the lean volume communicating with both lateral transfer ports and both rich volumes communicating with the rear transfer port and the inlet duct is divided into two inlet passages, namely a one lean passage and one rich passage, the lean passage communicating with the lean crankcase volume and the rich passage communicating with the two rich crankcase volumes. The inlet preferably constitutes a one piece casting.

The division of the interior of the crankcase into two or more substantially volumes may be effected in a number of ways. It is, however, conveniently effected by making use of the crankcase webs which are commonly provided, that is to say relatively massive discs which are integral with the crankshaft and are provided for the purpose of engine balance. Conventionally, two such crankcase webs are provided whose circular outer periphery is in close proximity to the internal surface of the crankcase. The division of the interior of the crankcase may thus be simply effected by providing a labyrinth seal or the like on the outer surface of each crankcase web. This labyrinth seal will constitute an annular groove or flange on each crankcase web which cooperates in a substantially sealed manner with a complementary annular flange or groove on the internal surface of the crankcase.

It is of course necessary for the operation of the invention that the carburettor supplies substantially all of the fuel to the or each rich inlet passage during high load operation and supplies it roughly equally to all the inlet passages during low load operation. This may be achieved in a number of ways and in one embodiment the carburettor has one or more jets arranged to introduce fuel into the inlet duct at a position immediately upstream of that at which it is divided into two or more inlet passages and the throttle valve is positioned such that, under low load conditions, it permits the fuel discharged from the jet(s) to flow into both the rich and lean passages and, under high load conditions, it directs substantially all the fuel to flow into the rich passage.

The carburettor may include an internal partition wall which forms a substantial continuation of the wall dividing the rich passage from the adjacent lean passage, an aperture being formed in the internal partition wall, and a throttle valve is pivotally mounted for movement within the said aperture, whereby the aperture is open under low load conditions and closed under high load conditions. It will be appreciated that in this case the carburettor jet(s) will be positioned to discharge into the inlet duct at a position immediately upstream of the rich passage but towards the aperture in the internal partition wall, whereby when the aperture is closed by the throttle valve all the fuel is constrained to flow into the rich passage and when the aperture is open as a result of the fact that the throttle valve has moved to a position in which it throttles the inlet duct the fuel can flow, at least in part, through the aperture and thus flows into both the rich and lean passage.

The carburettor described above is believed to have application in engines whose construction differs from that referred to above and the present invention also embraces such a carburettor per se. Thus according to a further aspect of the present invention there is provided a carburettor for use with a two-stroke engine of the type in which the engine inlet duct is divided into two separate passages, the carburettor including a duct, which, in use, forms part of the inlet duct of the engine, one or more fuel jets arranged to introduce fuel into the duct and a throttling valve which is pivotally movable between a closed position, in which it substantially closes the duct, and an open position in which it extends substantially parallel to the intended direction of air flow through the duct and substantially divides the duct into two passages, a first passage closest to the fuel jet(s) and a second passage further from the fuel jet(s), characterised in that the fuel jet(s) are arranged to direct fuel towards the throttling valve, whereby when the valve is open substantially all the fuel flows into the first passage and substantially only air flows through the second passage and when the valve is closed fuel flows into both the first and second passages. The invention also embraces such a carburettor when connected to an engine inlet duct which is divided into two separate passages, a rich passage and a lean passage, by a partition wall, the throttling valve substantially forming a continuation of the partition wall when in the closed position.

In an alternative embodiment, the throttle valve is mounted for pivotal movement about an axis which is situated upstream of the carburettor jet(s) and the throttle valve has one or more formations on it arranged to cooperate with the wall dividing the rich passage from the adjacent lean passage(s) whereby, under high load conditions, when the throttle valve is open, the carburettor jet(s) is situated in a space which does not communicate with the lean passage (s) and all the fuel flows into the rich passage and, under low load conditions, when the throttle valve is substantially closed, the carburettor jet(s) is situated in a space which communicates with the rich passage and the lean passage(s) and the fuel flows into all the inlet passages.

BRIEF DESCRIPTION OF THE DRAWINGS

Further features and details of the invention will be apparent from the following description of one specific embodiment which is given by way of example with reference to the accompanying highly schematic drawings, in which.

DETAILED DESCRIPTION OF THE PREFERRED EMBODIMENTS

Figure 1:
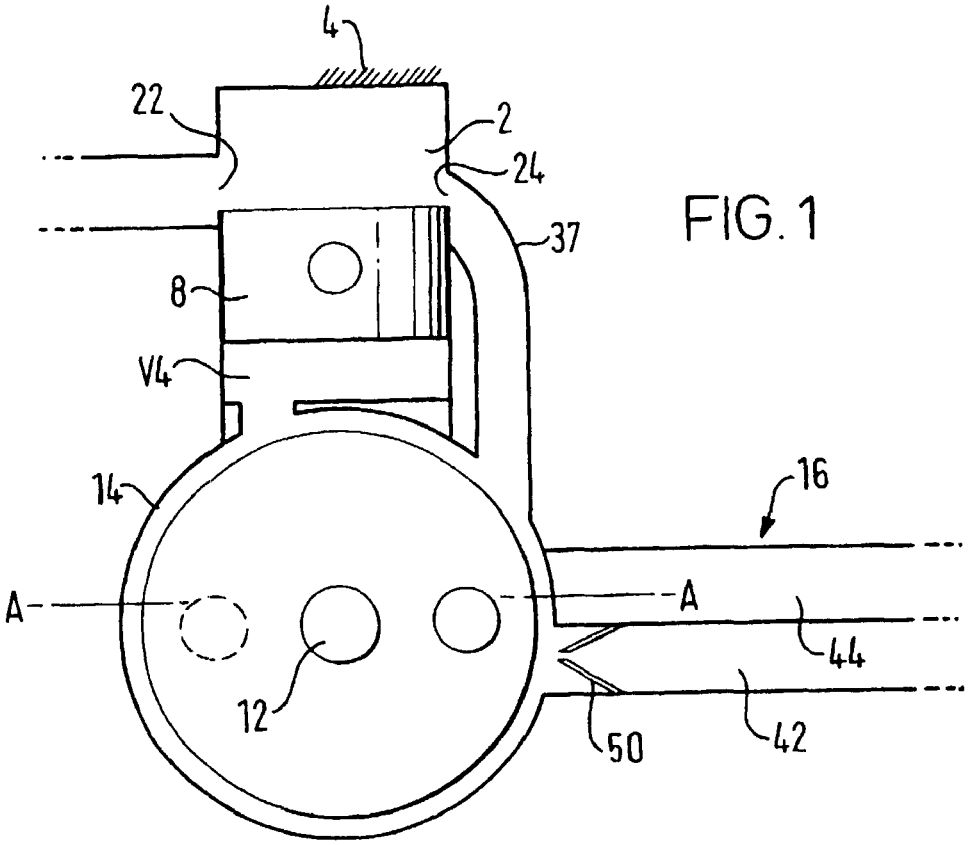
FIG. 1 is a side sectional view on the line B—B in FIG. 2 of a two-stroke engine in accordance with the invention.
Figure 2:
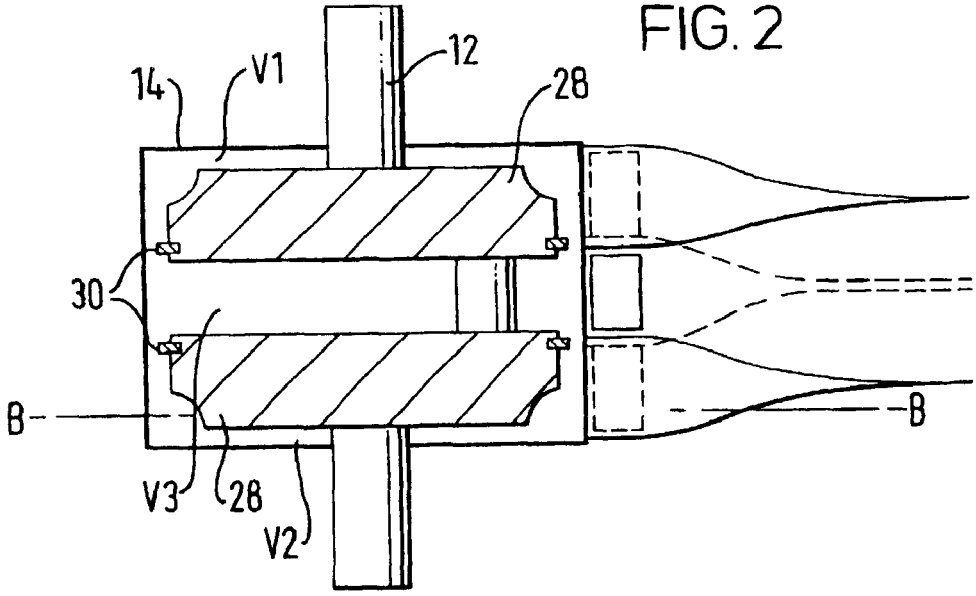
FIG. 2 is a sectional view on the line A—A in FIG. 1.

The engine may have one or more cylinders but only one cylinder is shown and will be described. The cylinder 12 is closed by a cylinder head 4 through which a spark plug (not shown) projects in the usual manner. Reciprocably accommodated within the cylinder is a piston 8 which is connected by a connecting rod (not shown) to a crankshaft 12 arranged within a crankcase 14.

Communicating with the interior of the crankcase 14 is an inlet duct 16 at whose downstream end is a number of Reed valves or the like, which will be described in more detail below and are arranged to permit the flow of air in one direction only, that is to say into the crankcase.

Arranged upstream of the Reed valves is a carburettor 18, upstream of which in turn or forming part of which is a throttle valve 20 of conventional type linked to the accelerator or throttle of the engine.

Communicating with the interior of the cylinder 2 is an exhaust port 22 and also, at a position slightly closer to the crankshaft 12, a rear transfer port 24, which is diametrically opposed to the exhaust port 22. Also communicating with the cylinder are two diametrically opposed lateral transfer ports 26 which are situated approximately midway between the exhaust and rear transfer ports.

Each of these ports may be a single aperture or a number of apertures. The crankshaft 12 is provided with two axially spaced crank webs 28, that is to say relatively massive integral discs of circular section whose outer edge is relatively close to the internal surface of the crankcase, as are commonly provided for the purpose of imparting balance to the crankshaft. The outer surface of each crank web 28 is substantially sealed to the adjacent inner surface of the crankcase by a respective labyrinth seal 30 comprising a mating annular tongue and groove. The interior of the crankcase is thus divided into three separate chambers or volumes in the axial direction, namely rich volumes V1 and V2 at the two ends and a lean volume V3 in the middle. It is not essential that these volumes be completely sealed from one another but merely that they are substantially so.

The volume between the crankcase and the underside of the piston, when in the bottom dead center position, which is designated V4 in FIG. 1 is normally less than a quarter of that of the interior of the crankcase and normally communicates with the interior of the crankcase through a large hole. However, in the present case this hole is reduced in size by a web 32 in which there is a central hole 34 through which the volume V4 communicates only with the central lean volume V3 in the crankcase. The two rich volumes V1 and V2 communicate with the volume V4 by way of respective communication holes 36.

Figure 3:
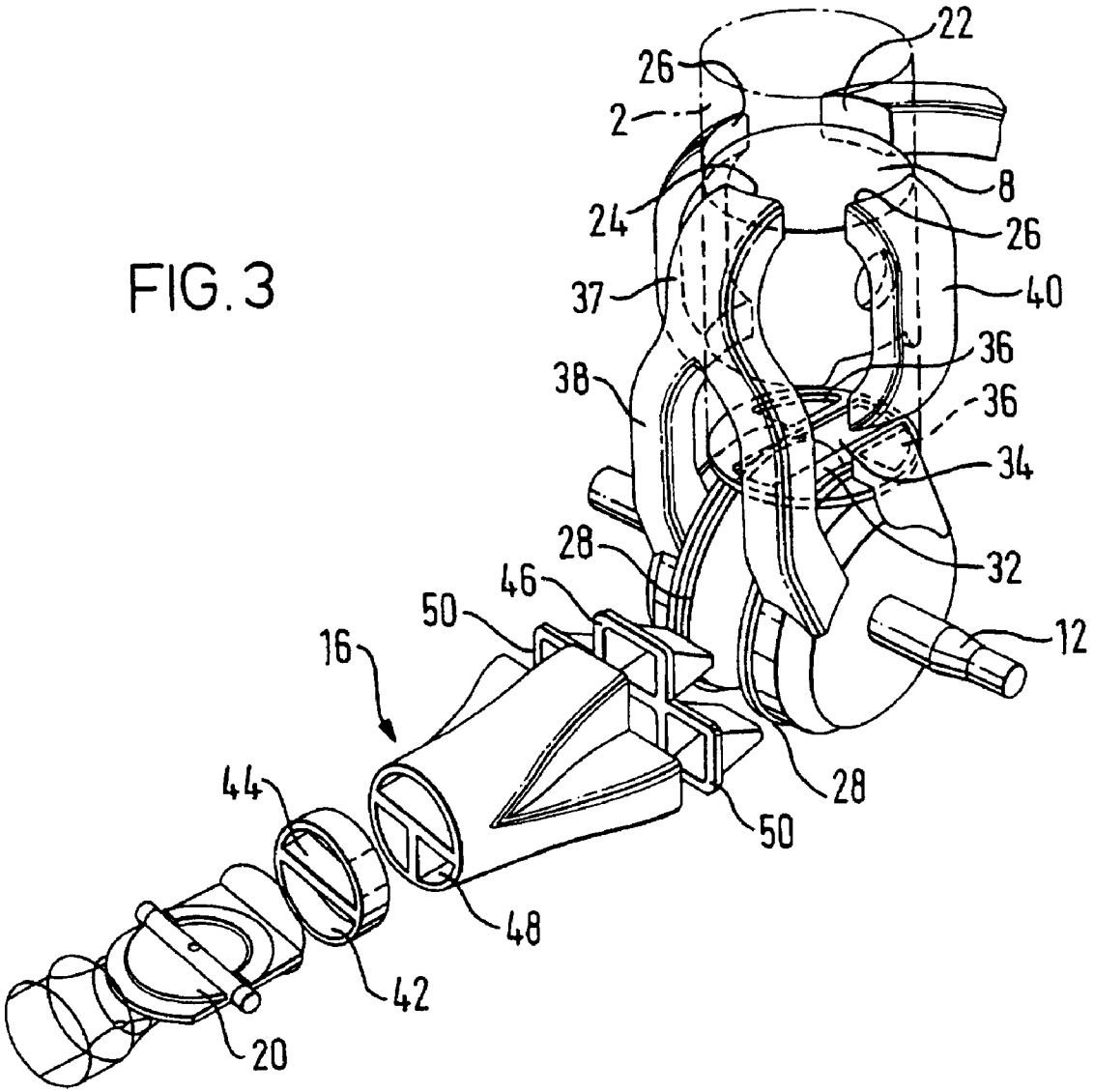
FIG. 3 is a perspective, partly exploded view of the engine from which certain features have been omitted for the sake of clarity.

The rear transfer port 24 communicates with the two rich volumes V1 and V2 via a passage 37 which branches into two respective communication passages 38. The lateral transfer ports 26 communicate via respective transfer passages 40 either directly with the lean volume V3 in which case the transfer passages 40 are relatively long, or indirectly via the volume V4, in which case the transfer passages are relatively short, as shown in FIG. 3. In the latter case the connection with the volume V4 is at a point below the underside of the piston, when in the bottom dead center position.

The inlet duct 16, which in this case is a one piece metal casting, is divided into two inlet passages, a lean passage 44 and a rich passage 42. The lean passage 44 communicates with the lean volume V3 via Reed valve 46. The rich passage 42 branches into two passages 48 which communicate with respective rich volumes V1 and V2 via respective Reed valves 50. Small holes, not shown, may be provided in the passage walls to ensure pressure balance between all the passages. These may result in a very small amount of fuel entering the lean passages but this is of no consequence, as also is any small amount of leakage that occurs around the labyrinth seals 30.

The carburettor 18 and/or the throttle valve 20 are so constructed and operated that, under high load conditions, substantially only pure air is introduced into the lean passage 44 and a fuel/air mixture is introduced into the rich passage 42 but, under low load or idling conditions, a fuel/air mixture is introduced into all the passages.

In use, when operating under high load, as the piston moves on its compression stroke reduced pressure is created in the volume V4 which is applied to the volumes V1, V2 and V3 through the holes 34 and 36. Substantially pure air is thus induced into the lean volume V3 through the Reed valve 46 and fuel/air mixture is induced into the two rich volumes V1 and V2 through the Reed valves 50. The mass flow into V3 is substantially greater than into V1 and V2. The greater volume of air entering V3 and the fact that the hole 34 is larger than the holes 36 means that V4 is filled substantially only with pure air. On the expansion or working stroke of the piston, the exhaust port 22 is uncovered first by the piston and the majority of the exhaust gas flows through it and thence away to the atmosphere. The lateral transfer ports 26 are then uncovered and pure air flows through them from volume V4 and the lean volume V3 via the transfer passages 40. The exhaust port is still open and at least a proportion of the air flows out through it, thereby scavenging the remaining exhaust gas from the cylinder. At the same time or, more preferably, shortly thereafter, the rear transfer port 24 is uncovered and fuel/air mixture flows through it from the rich volumes V1 and V2 via the passages 37 and 38. As the rear transfer port 24 is further than the lateral transfer ports 26 from the exhaust port 22 and is also inclined to direct the flow through it upwardly, that is to say towards the cylinder head, little or none of the fuel air mixture flows out through the exhaust port. This effect is reinforced by the fact that the majority of the total air input flows in through the lateral transfer ports, only about one quarter flowing in through the rear transfer port. The relatively weak flow of the air/fuel mixture through the rear transfer port is therefore "squashed" against the wall of the cylinder opposite to the exhaust port by the more vigorous flows of the lateral transfer ports and is thus prevented from flowing to the exhaust port. The charge in the cylinder is thus stratified, that is to say nonhomogeneous, with that portion of the charge which is closer to the exhaust port being weaker than that portion which is closer to the rear transfer port. Ignition then occurs in the usual manner and the cycle is repeated.

However, when operated under low load or idling conditions a fuel/air mixture is supplied to all three inlet passages and thus to all three volumes V1, V2 and V3. Scavenging is then performed with fuel/air mixture but since all the air which is introduced into the cylinder carries fuel it is considerably leaner than the fuel/air mixture is when it is introduced through the rear transfer port alone. Whilst a small amount of fuel is lost to the atmosphere when scavenging this scavenging loss is acceptably small.

Figure 4:
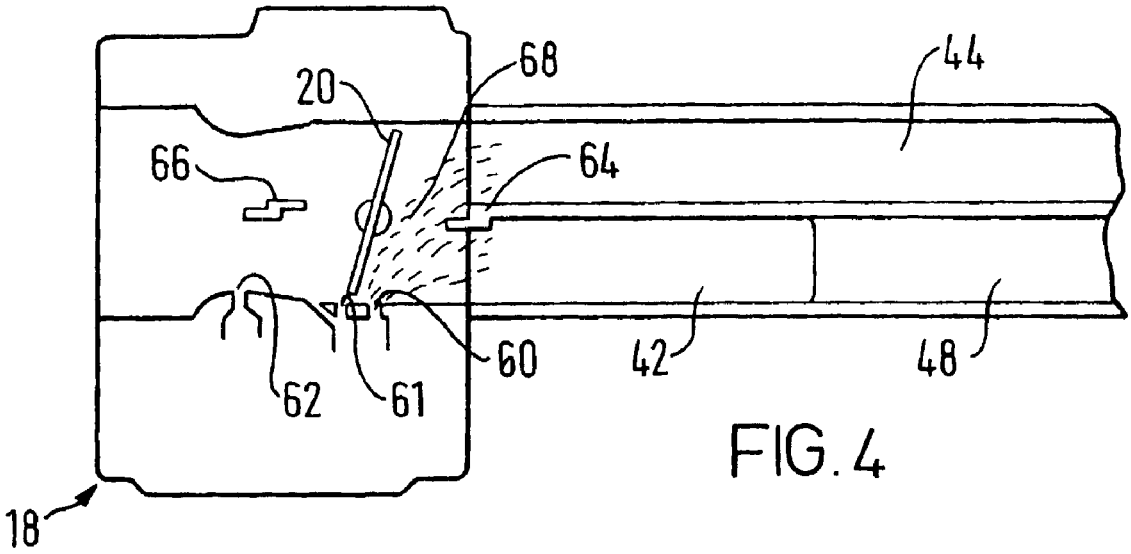
FIGS. 4, 5 and 6 are side sectional views of one possible embodiment of the carburettor and upstream end of the inlet duct when under low load, intermediate load and high load conditions, respectively.
Figure 5:
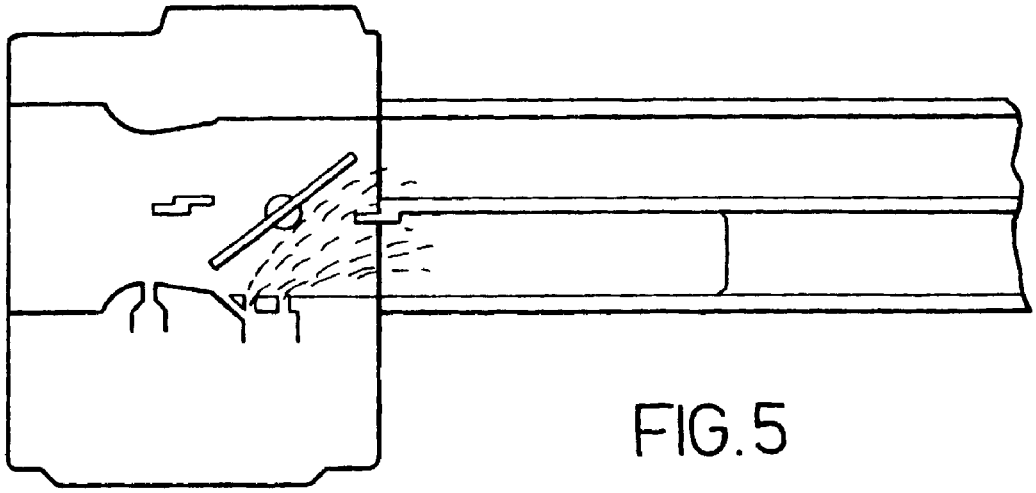
Figure 6:
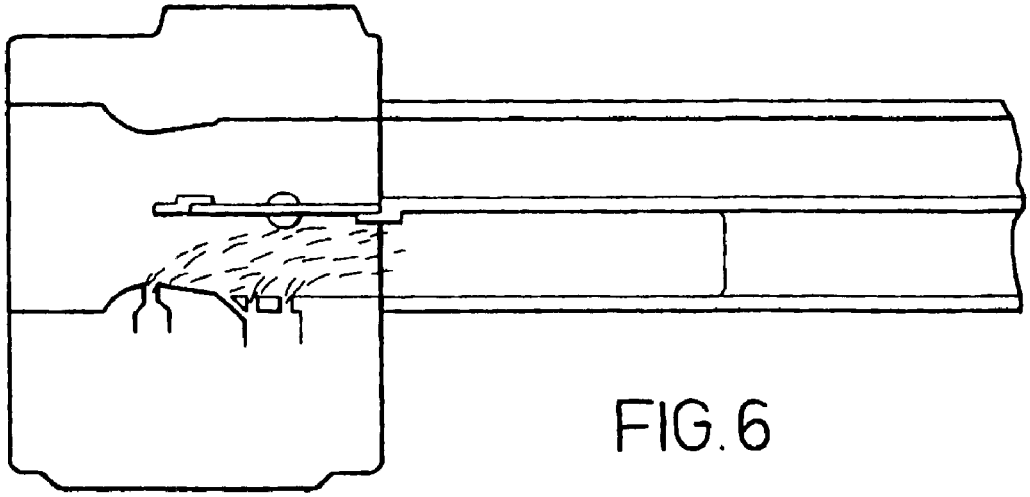

The carburettor and throttle valve are shown in more detail in FIGS. 4 to 6. The detailed construction of the carburettor is unimportant and for the most part known and it will be seen that it has a primary or idle jet 60, an intermediate jet 61 and a full load jet 62. The throttle valve 20, which is of butterfly type, is situated above the idle jet 60. The inlet duct is divided by a partition wall 64 into two passages 44 and 42 immediately downstream of the idle jet. The carburettor body includes a partition wall 66 which forms a continuation of the partition wall 64 and in which is formed an aperture 68 which accommodates and may be closed by the butterfly valve 20. When the engine is idling, the butterfly valve substantially blocks the inlet duct, as shown in FIG. 4. Fuel discharged from the idle jet enters the inlet duct upstream of the partition wall 64 and is thus carried generally equally by the airflow into the passages 44 and 42.

The passage 42 divides into the two rich passages 48 at some point and all three volumes of the crankcase thus receive a substantially equally rich fuel/air mixture and the engine is homogeneously charged. Although a certain amount of fuel flows straight into the exhaust during the scavenging process, the amount is acceptably small first because only a small amount of fuel is in any event necessary in idling operation and secondly because the fuel/air mixture is much leaner when the engine is idling than under full load because in the latter condition fuel is introduced into the cylinder only through the rear transfer port whereas in idling operation it is introduced through the rear and lateral transfer ports.

In high load operation the butterfly valve does not substantially block the inlet duct at all but it does close the aperture 68, as shown in FIG. 6, and thereby ensures that all the fuel sprayed from the idle, intermediate and full load jets 60, 61 and 62 flows into the rich passage 42. Substantially pure air flows through the lean passage 44, though it is not a problem if a small amount of fuel gains access to the lean passage. The crankcase volumes V1 and V2 are thus charged with air/fuel mixture and the volume V3 is charged with substantially fuel-free air. The cylinder therefore receives a stratified charge, as described above, and scavenging losses are very low.

Under intermediate load the butterfly valve 20 occupies the position shown in FIG. 5 in which both the inlet duct and the aperture 68 are partially open. Fuel is sprayed from the idle and intermediate jets and whilst most of it flows into the rich passage 42, a proportion of it also flows into the lean passage 44. The engine charge is thus what one might term partially stratified.

In a modified embodiment the inlet duct is divided by two partition walls into three inlet passages, namely two lean passages, between which is a single rich passage. The carburettor is provided with a jet arranged to supply fuel at a position which is shortly upstream of the upstream ends of the partition walls and generally between the two partition walls, that is to say in a position directly upstream of the rich passage. The butterfly valve is mounted to rotate about an axis shortly upstream of the carburettor jet and carries two parallel webs on one surface which are spaced apart by a distance corresponding to the spacing of the partition walls in the inlet duct. These webs are arranged to cooperate with the partition walls such that under high load conditions they substantially abut or are in sliding contact with the partition walls whereby the carburettor jet supplies fuel into a space which communicates only with the rich passage. However, under low load conditions, when the butterfly valve substantially blocks the inlet duct, the carburettor jet supplies fuel into a space which communicates with all three inlet passages, whereby the fuel flows into not only the rich passage but also the two lean passages.

In a further modified embodiment the Reed alves are omitted and the crank webs 28 are positioned to shut off the downstream ends of the rich passages 48. However, a cut-out or aperture is provided in the periphery of each crank web at the appropriate position to permit fuel/air mixture to flow into the rich volumes V1 and V2 at the appropriate times. The crank webs thus act as valve members cooperating with the ends of the rich passages. The necessary valving of the lean passage may be achieved by connecting it to the cylinder via an additional air inlet port provided e.g. below the exhaust port 22. The air inlet port will then be controlled by the piston itself in a manner known per se to permit air to flow into the volume V4 and thus into the lean volume V1 at the appropriate times.

While the foregoing description and drawings represent the preferred embodiments of the present invention, it will be obvious to those skilled in the art that various changes amd modifications may be made therein without departing from the true spirit and scope of the present invention.

What is claimed is:

1. A stroke engine of crankcase scavenged type comprising:

a piston reciprocably mounted in a cylinder having a cylinder wall, the cylinder wall having formed therein an exhaust port and a rear transfer port opposed to one another, a crank case having an interior communicating with the rear transfer port via a rear transfer passage, the rear transfer port being arranged to open before the exhaust port closes whereby, in use, the cylinder is scavenged, an inlet duct coupled to and arranged to supply combustion air to the crankcase, a throttling valve arranged to throttle the flow of air through the inlet duct, a carburetor arranged to supply fuel into the inlet duct, the crankcase having at least two substantially separated chambers defining at least two separate crankcase volumes, a rich volume and a lean volume, each crankcase volume communicating with the cylinder via a respective hole in the crankcase wall, the cylinder wall having at least one lateral transfer port formed between the rear transfer port and the exhaust port, the lateral transfer port being arranged to open before the exhaust port closes, the lateral transfer port communicating with the lean volume via a lateral transfer passage, the rear transfer port communicating with the rich volume, the inlet duct being divided over at least part of its length into at least two inlet passages, a rich passage and a lean passage, which communicates with the rich volume and the lean volume, respectively, and the carburetor and the throttle valve are adapted to supply, under high load operation, substantially all the fuel into the rich passage and to supply, under low load operation, the fuel into both the rich and lean passages.

2. The engine as claimed in claim 1 in which the cylinder wall has formed therein two opposed lateral transfer ports, the interior of the crankcase is further divided into a second rich volume, the lean volume communicating with both lateral transfer ports and both rich volumes communicating with the rear transfer port, and the inlet duct is further divided to have a second lean passage, the two lean passages communicating with the lean volume and the rich passage communicating with the two rich volumes.

3. The engine as claimed in claim 2 in which the carburetor has one or more jets arranged to introduce fuel into the inlet duct at a position immediately upstream of that at which it is divided into two or more inlet passages.

4. The engine as claimed in claim 3 in which the carburetor includes an internal portion wall which forms a continuation of the wall dividing the rich passage from the adjacent lean passage, an aperture being formed in the internal partition wall, and the throttle valve is pivotally mounted for movement within the said aperture, whereby the aperture is open under low load conditions and closed under high load conditions.

5. The engine as claimed in claim 1 in which the carburetor has one or more jets arranged to introduce fuel into the inlet duct at a position immediately upstream of that at which it is divided into two or more inlet passages.

6. The engine as claimed in claim 5 in which the carburetor includes an internal partition wall which forms a continuation of the wall dividing the rich passage from the adjacent lean passage, an aperture being formed in the internal partition wall, and the throttle valve is pivotally mounted for movement within the said aperture, whereby the aperture is open under low load conditions and closed under high load conditions.

*7. A two-stroke engine of crankcase scavenged type comprising:*

*a piston reciprocably mounted in a cylinder having a cylinder wall, the cylinder wall having formed therein an exhaust port and at least two transfer ports,*

*a crankcase having an interior communicating with the transfer ports via respective transfer passages,*

*the transfer ports being arranged to open before the exhaust port closes whereby, in use, the cylinder is scavenged,*

*an inlet duct coupled to and arranged to supply combustion air into the crankcase,*

*a throttling valve arranged to throttle the flow of air through the inlet duct,*

*a carburetor arranged to supply fuel into the inlet duct,*

*the engine having at least two substantially separated chambers defining at least two separate volumes, a rich volume and a lean volume, each volume communicating with the cylinder,*

*the inlet duct being divided over at least part of its length into at least two inlet passages, a rich passage and a lean passage, which communicates with the rich volume and the lean volume, respectively, and*

*the carburetor and the throttling valve are adapted to supply, under high load operation, substantially all the fuel into the rich passage and to supply, under low load operation, the fuel into both the rich and lean passages.*

*8. The engine as claimed in claim 7 in which the carburetor has one or more jets arranged to introduce fuel into the inlet duct at a position immediately upstream of that at which it is divided into two or more inlet passages.*

*9. The engine as claimed in claim 8 in which the carburetor includes an internal partition wall which forms a continuation of the wall dividing the rich passage from the adjacent lean passage, an aperture being formed in the internal partition wall, and the throttling valve is pivotally mounted for movement within the said aperture, whereby the aperture is open under low load conditions and closed under high load conditions.*

*10. A two-stroke engine of crankcase scavenged type comprising:*

*a piston reciprocably mounted in a cylinder having a cylinder wall, the cylinder wall having formed therein an exhaust port and transfer ports,*

*a crankcase having an interior communicating with the transfer ports via respective transfer passages,*

*the transfer ports being arranged to open before the exhaust port closes whereby, in use, the cylinder is scavenged,*

*an inlet duct divided over at least part of its length into at least two inlet passages, a rich passage and a lean passage,*

*a carburetor adapted to supply, under high load operation, substantially all the fuel into the rich passage of the inlet duct to thereby provide a rich fuel/air mixture to said rich passage and substantially only air to said lean passage,*

*the carburetor also adapted to supply, under low load operation, a fuel/air mixture to both the rich and lean passages,*

*the rich and lean passages being in communication with the crankcase to provide, through the transfer passages, to the cylinder, under high load conditions a stratified fuel/air mixture and under low load conditions a homogeneous fuel/air mixture.*

*11. The engine as claimed in claim 10 in which the carburetor has one or more jets arranged to introduce fuel into the inlet duct at a position immediately upstream of that at which it is divided into two or more inlet passages.*

*12. The engine as claimed in claim 11 in which the carburetor includes a throttling valve and an internal partition wall which forms a continuation of the wall dividing the rich passage from the adjacent lean passage, an aperture being formed in the internal partition wall, and the throttling valve is pivotally mounted for movement within the said aperture, whereby the aperture is open under low load conditions and closed under high load conditions.*

* * * * *